Patented May 23, 1950

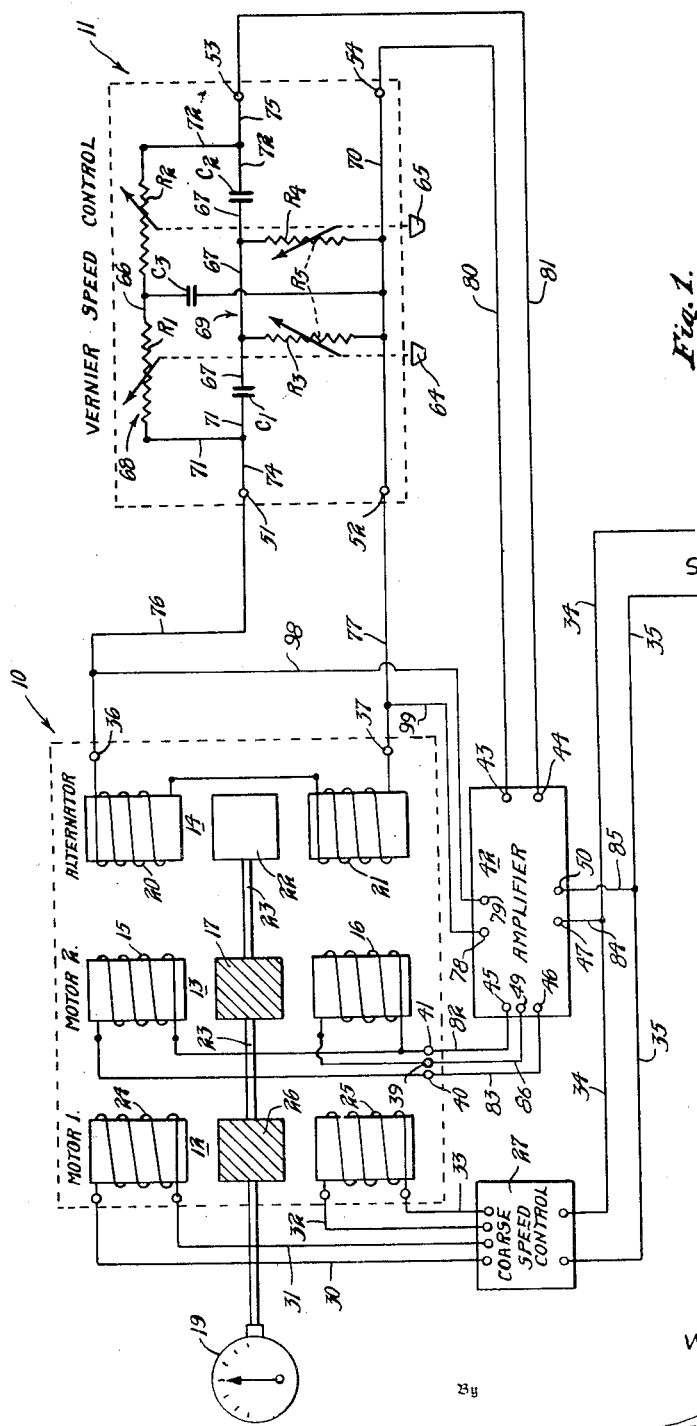

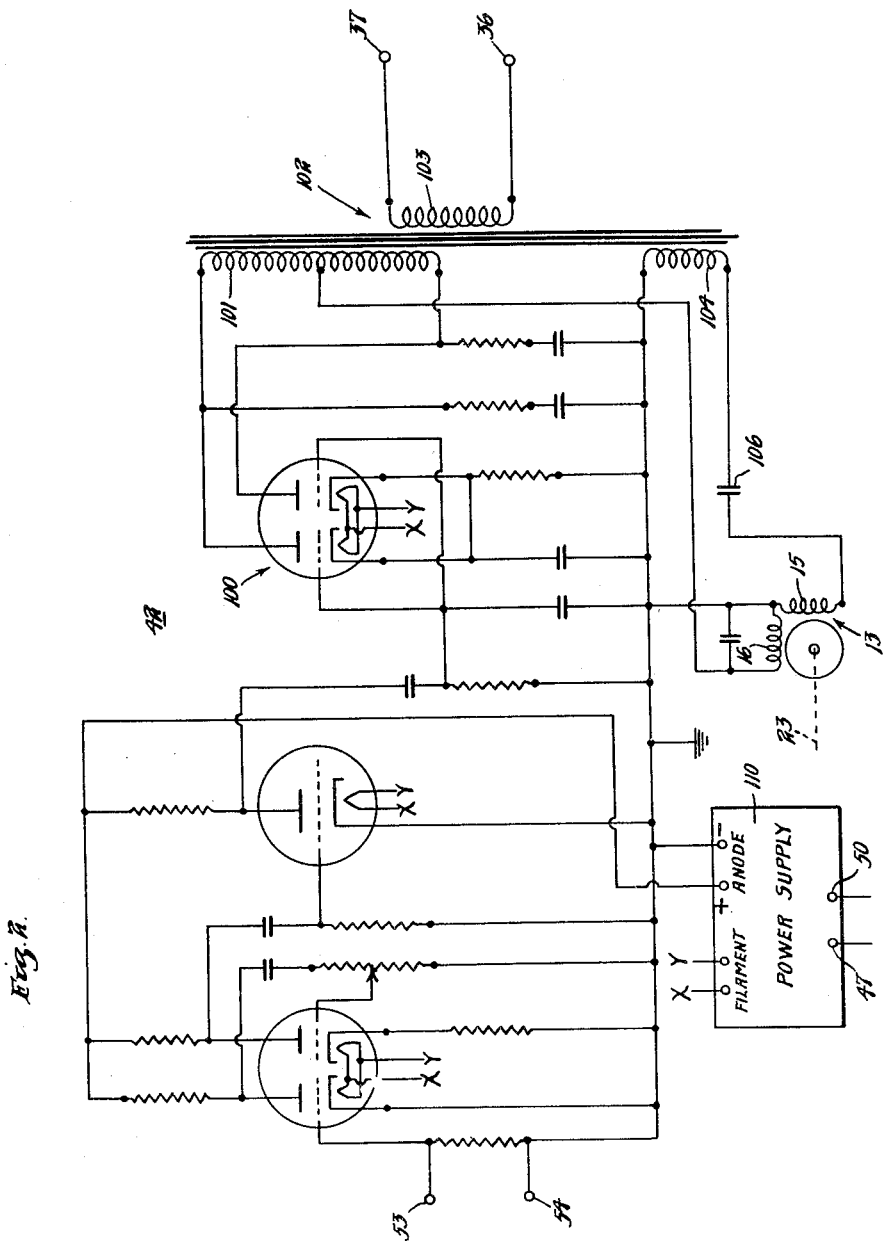

2,509,089

UNITED STATES PATENT OFFICE 2,509,089

PRECISION CONTROL DEVICE

William K. Ergen, Minneapolis, Minn., assignor to Minneapolis-Honeywell Regulator Company, Minneapolis, Minn., a corporation of Delaware Application July 17, 1944, Serial No. 545,340

16 Claims. (Cl. 318—328)

This invention relates to the field of computing and control operators, and more particularly to such devices in which the speed of a motor is determined by and regulated in accordance with a pair of factors whose values are manually adjustable.

It is an object of my invention to provide a new and improved speed calculator and regulator.

It is an object of my invention to provide a new and improved dynamo-electric machine peculiarly adapted for exact speed control according to my improved system.

It is another object of my invention to provide a new and improved frequency selective network particularly useful in my improved speed control system.

It is a further object of my invention to provide novel means whereby the speed of a motor may be regulated in proportion to the second root of the reciprocal of the product of the values of a pair of variables.

It is a further object of my invention to provide a device for solving the equation $$Z^2 = K\frac{1}{XY}$$

including means for varying the values of X and Y within a range.

It is yet another object of my invention to provide an electrical network transmitting an alternating current in a first time-phase relation if its frequency is less than a predetermined frequency, in the opposite time-phase relationship if its frequency is greater than the predetermined frequency, and not at all if the frequency is that predetermined, together with a pair of independently variable means for adjusting the value of the predetermined frequency.

Various other objects, advantages, and features of novelty which characterize my invention are pointed out with particularity in the claims annexed hereto and forming a part hereof. However, for a better understanding of the invention, its advantages, and objects attained with its use, reference should be had to the subjoined drawing which forms a further part of the specification and to the accompanying descriptive matter in which I have illustrated and described a preferred embodiment of my invention.

In the drawings:

Figure 1 is a schematic showing of my system and its component parts, illustrating the operative relationship between the various elements and the method of connecting them in the completed circuit, and Figure 2 is a wiring diagram showing the relation between certain components of my invention.

As I have shown in the drawing, my invention comprises a dynamo-electric machine 10 and a vernier speed control 11. I have shown my dynamo-electric machine as comprising a first motor 12, a second motor 13, and an alternator 14. Motor 13 is reversible and comprises a plurality of stator windings 15 and 16 and a rotor 17. Alternator 14 comprises a plurality of stator windings 20 and 21 and a rotor 22. Rotors 17 and 22 are mounted on a shaft 23 arranged to be driven by motor 12. A tachometer 19 is actuated by shaft 23 for indicating its speed of rotation.

I have shown motor 12 as comprising a plurality of stator windings 24 and 25 and a rotor 26 carried by shaft 23. I have also shown motor 12 as subject to regulation from a coarse speed control 27 to which I have indicated that the stator windings 24 and 25 are independently connected by conductors 30, 31, 32, and 33, and I have indicated that speed control 27 regulates the distribution to stator windings 24 and 25 of alternating current conducted to the speed control through conductors 34 and 35. It should be realized, however, that there is no necessity that energy be supplied to my dynamo-electric machine from an electric motor: motor 12 could be replaced with perfect satisfaction by a steam engine having a governor-controlled valve to replace speed control 27 in the showing of my drawing. The function of motor 12 is to bring about rotation of shaft 23 at a speed which may be roughly regulated to within a predetermined range, and any means accomplishing this function may be substituted for electric motor 12 and regulator 27 without departing from my invention. It should also be realized that my dynamo-electric machine will operate with reduced sensitivity, if no equivalent of motor 12 is provided, motor 13 being capable of functioning, as described later in detail, to cause rotation of shaft 23.

Alternator 14 is so wound that the frequency as well as the voltage of its output bear a known ratio to the speed of rotation of its rotor: for example, the speed of the rotor in revolutions per second may conveniently be numerically equal to the frequency of the output in cycles per second. A pair of output terminals 36 and 37 are provided for alternator 14, and terminals 39, 40 and 41 are provided for connecting an energizing circuit to motor 13. I have shown motor 13 as energized through an amplifier 42 having signal input terminals 43 and 44, signal output terminals 49, 45 and 46, and power input terminals 47 and 50.

My vernier speed control is shown to have a pair of input terminals 51 and 52, a pair of output terminals 53 and 54, a first pair of variable resistors $R_1$ and $R_2$, a second pair of variable resistors $R_3$ and $R_4$, a pair of reactive impedances $C_1$ and $C_2$ which I have shown in the form of fixed condensers, and a further reactive impedance $C_3$, also in the form of a fixed condenser. The movable arms of input resistors $R_1$ and $R_3$ are connected for simultaneous operation by a common knob 64, and the movable arms of output resistors $R_2$ and $R_4$ are similarly operable by a common knob 65. Knobs 64 and 65 are provided with indices which are rotatable with respect to fixed scales.

It will be seen that resistors $R_1$ and $R_2$ are connected in a series circuit 68 by conductor 66; that condensers $C_1$ and $C_2$ are connected in a second series circuit 69 by conductor 67; and that input terminal 52 is connected with output terminal 54 by conductor 70. Series circuits 68 and 69 are conneced to form a parallel circuit by conductors 71 and 72, and the parallel circuit is connected between input terminal 51 and output terminal 53 by conductors 74 and 75, respectively. Condenser $C_3$ is connected between conductor 66 and conductor 70, and variable resistors $R_3$ and $R_4$ are both connected between conductor 67 and conductor 70, so that they are in fact connected in parallel to have as equivalent resistance $R_5$. Connection is made from the output terminals of alternator 14 to the input terminals of speed control 11 by conductors 76 and 77, respectively, and the output of speed control 11 is connected to the input terminals of amplifier 42 by conductors 80 and 81. The output terminals of amplifier 42 are connected with the input terminals of motor 13 by conductors 82, 83 and 86, and energy is provided to amplifier 42 from conductors 34 and 35 by conductors 84 and 85. Terminals 78 and 79 of amplifier 42 are connected to terminals 36 and 37 of alternator 14 by conductors 98 and 99.

It is a peculiar property of the network comprising my vernier speed control that for a certain frequency of alternating potential impressed on the input terminals no resulting output alternating potential appears across the output terminals. The value of this frequency may be determined, if the values of the various circuit elements are known, from the equation:

$$\omega^2 = \frac{C_1 + C_2}{R_1 R_2 C_1 C_2 C_3} \qquad 1$$

The impedance balance equation is $$\frac{C_1 + C_2}{C_3} = \frac{1}{R_5} \cdot \frac{R_1 R_2}{R_1 + R_2} \qquad 2$$

In these equations $\omega$ is the frequency to be determined, $C_1$, $C_2$, and $C_3$ are the capacitances of the respective condensers $R_1$ and $R_2$ are the resistances of the respective variable resistors and $R_5$ is the equivalent resistance of the parallel combination of resistors $R_3$ and $R_4$.

In Equation 2 above, let $$\frac{C_1 + C_2}{C_3} = a \qquad 3$$

under these conditions, the equation simplifies to read $$R_5 = \frac{R_1 R_2}{a(R_1 + R_2)} \qquad 4$$

This condition exists when $R_5$ is a pair of resistors in parallel having resistances of $$\frac{R_1}{a} \text{ and } \frac{R_2}{a}$$

I have accordingly constructed my vernier speed control so that the ratio of the resistance of resistor $R_1$ to that of resistor $R_3$ and the ratio of the resistance of resistor $R_2$ to that of $R_4$ have the numerical value $$\frac{C_3}{C_1 + C_2}$$

Since the resistors are arranged to operate simultaneously in pairs, this resistance ratio once established for the full resistance of the respective resistors is maintained for all adjusted positions of the resistances.

It is apparent from the foregoing discussion that by operation of knobs 64 and 65 the input frequency at which no output signal is given by the network may be adjusted within a certain range determined by the range of variation of the resistors. Motor 12 is arranged for operation under the regulation of speed control 27 at a speed generally within such a range as will cause the frequency of the alternating current generated by alternator 14 to come within the range just referred to, although the speed may not be constant but may vary throughout the entire range. It is another property of my network 11 that if the frequency of the alternating current impressed upon input terminals 51 and 52 is greater than the predetermined frequency which has been set by manipulation of knobs 64 and 65, an output potential appears across terminals 53 and 54 which is of a certain time-phase relationship, while if the frequency of the alternating current impressed upon input terminals 51 and 52 is less than the predetermined frequency, the output potential is of the opposite time-phase relationship. I make use of this property of my circuit to impress upon amplifier 42 an input potential which reverses in phase as the frequency of alternator 14 varies through the predetermined frequency.

Amplifier 42 is of that type of device which energizes motor 13 for operation in a first direction on receiving an input of a first time-phase relationship, and to operate in the opposite direction on receiving an input potential of the opposite phase relationship; such an amplifier is shown in Figure 2, and is described in complete detail in the Patent 2,423,534 to Albert P. Upton, issued July 8, 1947, assigned to the assignee of the present patent.

Figure 2 shows that the voltage output of network 11, delivered at terminals 53 and 54, is subjected to three stages of resistance coupled amplification and then is impressed upon the input of a phase discriminator circuit included in the duplex triode 100. The anode circuits of this tube are energized, in opposite phase relation, from a first secondary winding 101 of a transformer 102 whose primary winding 103 is energized from the output terminals 36 and 37 of alternator 14. A further secondary winding 104 of transformer 102 continuously energizes one set of windings 105 of motor 13 through a series condenser 106.

The other set of windings 16 of motor 13 is energized from a center tap of winding 101. The input terminals 47 and 50 of a conventional power supply unit 110 are energized with alternating current from conductors 84 and 85, and the unit supplies low alternating voltage to the filaments of the amplifier tubes, in addition to rectifying and filtering the alternating voltage for providing continuous anode potentials for the resistance coupled amplifier stages.

The operation of amplifier 42, as described in more detail in the copending application referred to, is such that when the voltage between terminals 37 and 36 is in phase with that between terminals 53 and 54, motor 13 operates in a first direction, while when the voltages are 180 degrees out of phase the motor operates in the opposite direction.

The operation of my invention as a speed regulator will now be clearly understandable. Energization of motor 12 through control 27 brings about rotation of shaft 23 at a speed varying within relatively coarse limits of control. Alternator 14 accordingly generates a potential varying in frequency as the speed of shaft 23 varies, and this potential is applied through vernier speed control 11 to the input terminals of amplifier 42. The desired exact speed of shaft 23 being known, the frequency corresponding thereto can be calculated, and by reference to a previously prepared table the settings of knobs 64 and 65 required to make Equation 1 balance for this frequency may be found. If now the speed of shaft 23 is that desired, the frequency impressed upon the input terminals of vernier control 11 is that at which the equation balances, and no signal potential is impressed upon amplifier 42. No energization is applied to motor 13 and shaft 23 rotates under the sole driving force of motor 12.

Of course, it is not necessary to make the calculations and refer to the table if an accurate means for indicating the speed of the shaft directly is provided: in such a case knobs 64 and 65 are simply operated until the indicator shows that the speed of shaft 23 is that desired.

Now assume that the speed of motor 12 increases somewhat so that alternator 14 generates a frequency higher than that predetermined by the setting of knobs 64 and 65. Then an output signal appears across terminals 53 and 54 of speed control 11, and is impressed upon amplifier 42, of such a nature that stator windings 15 and 16 of motor 13 are energized from the amplifier. The polarity of this energization is such that the stator windings act upon rotor 17 to oppose the rotation of the rotor due to the motor 12. In this fashion, a magnetic braking is applied to shaft 23 whose magnitude increases rapidly with increase in the speed of the shaft beyond the desired speed.

In the same fashion, let it be assumed that the speed of motor 12 decreases below the desired speed. Then the frequency of the alternating current generated by alternator 14 and impressed upon input terminals 51 and 52 of speed control 11 is less than that to which the network has been adjusted, and an output of opposite phase now appears upon terminals 53 and 54 and is transmitted through amplifier 42 to appear as opposite energization of stator windings 15 and 16. Under these conditions, the magnetic cooperation between windings 15 and 16 and rotor 17 is such as to augment the effect of motor 12 in causing rotation of shaft 23, whose speed accordingly increases.

Referring again to Equation 1, it will be seen that the equation is of the form $$Z^2 = K \frac{1}{XY} \qquad 5$$

where $Z = \omega$, $X = R_1$, $Y = R_2$, and $$K = \frac{C_1 + C_2}{C_1 C_2 C_3}$$

Since the values of $C_1$, $C_2$, and $C_3$ are fixed and since $R_1$ and $R_2$ are adjustable by knobs 64 and 65, this network may be used to solve Equation 5 for Z, the value of Z being read from tachometer 19. The scales cooperating with knobs 64 and 65 are graduated in units of $K/R_1$ and $K/R_2$ but the scales are numbered in values of $R_1$ and $R_2$. If therefore it is desired to solve the equation $$Z_2 = \frac{1}{265 \times 82}$$

for example, knob 64 is set to indication 265 on its scale and knob 65 is set to indication 82 on its scale. The reading of the tachometer gives the value of Z directly, the accuracy of the reading being determined by the accuracy of the components of the vernier speed control network and the accuracy of the tachometer.

It will be appreciated that if my invention is to be used as a computer over wide ranges of Z, the coarse speed control 27 must be adjusted concurrently with vernier control 11, or entirely omitted. The lower limit of Z is determined in the latter case by the completeness with which motor 13 is able to overcome the driving effect of motor 12 and its upper limit by the combined driving effect of motors 12 and 13 taken together; however, the accuracy of the control falls off somewhat as the effective force of motor 13 becomes increasingly dominant in the instrument.

In this specification I have disclosed the combination of a dynamo-electric machine with a vernier speed control in the form of an electric network, the combination being arranged to automatically increase the speed of the dynamo-electric machine if it falls below a certain desired speed and to automatically decrease its speed if it is in excess of the desired speed: I have also shown means for adjusting the system so that any desired speed within the range of the system may be determined by the operator, and so that the speed referred to is automatically adjusted to vary in accordance with a particular mathematical formula which I have set forth. It must be realized, however, that the system is of more general utility than that specifically set forth here: for example, substitution of inductive reactances for capacitive reactances, while not affecting the efficacy of the system as a speed control arrangement, makes possible a solution of the equation $Z^2 = K(XY)$ instead of the equation $$Z^2 = K \frac{1}{XY}$$

Numerous objects and advantages of this invention have been set forth in the foregoing description, together with details of the structure and function of the invention, and the novel features thereof are pointed out in the appended claims. The disclosure, however, is illustrative only, and I may make changes in detail, especially in matters of shape, size and arrangement of parts within the principle of the invention to the full extent indicated by the broad general meaning of the terms in which the appended claims are expressed.

I claim as my invention:

1. In a device of the class described, an electrical balanceable network having a frequency responsive member causing the network to have no output voltage for an input alternating voltage of a predetermined frequency and to have increasing output voltage for input alternating voltages of frequencies increasingly different from said predetermined frequency, the output voltages from said network due to frequencies greater than said predetermined frequency being displaced in phase by 180 degrees from the output voltages from said network due to frequencies less than said predetermined frequency, means supplying alternating voltage of generally said predetermined frequency to said network, and reversible means actuated by the output voltage from said network for varying the frequency of said supply of alternating voltage toward said predetermined value.

2. In a device of the class described, an electrical network comprising input and output reactive impedances connected by a first conductor in a first series circuit, first input and output resistive impedances connected by a second conductor in a second series circuit, first input and output terminals, said series circuits being connected in a parallel circuit between said first terminals, second input and output terminals, a third conductor joining said second terminals, a reactive impedance connected across said second and third conductors, second input and output resistive impedances connected in parallel between said first conductor and said third conductor, means for simultaneously varying both said input resistive impedances, and independent means for simultaneously varying both said output resistive impedances.

3. In a device of the class described, a shaft to be rotated at a predetermined angular velocity, first motor means supplying primary energy of rotation to said shaft, whereby to bring about rotation of said shaft at generally said predetermined velocity, means carried in part by said shaft for generating an alternating potential having a frequency determined by said velocity of said shaft, an electric network having input and output terminals, means connecting said generator with said input terminals, reversible electric motor means carried in part by said shaft and supplying secondary energy of rotation to said shaft, and means connecting said electric motor means with said output terminals of said network, said network reversibly energizing said electric motor means to apply torque to rotate said shaft in the same direction as said first motor means when said frequency is less than that corresponding to said predetermined velocity of said shaft, and in the opposite direction to said first motor means when said frequency is greater than that corresponding to said predetermined velocity of said shaft.

4. In a device of the class described, an electrical balanceable network having a frequency responsive member causing the network to have no output voltage for an input alternating voltage of a predetermined frequency and to have increasing output voltage for input alternating voltages of frequencies increasingly different from said predetermined frequency, the output voltages from said network due to frequencies greater than said predetermined frequency being displaced in phase by 180 degrees from the output voltages from said network due to frequencies less than said predetermined frequency, means supplying alternating voltage of generally said predetermined frequency to said network, and reversible means actuated by the output voltage from said network for varying the frequency of said supply of alternating voltage toward said predetermined value, said network including adjusting means whereby said predetermined frequency may be selected from within a range of frequencies, the frequency of said supply being also within said range.

5. In a device of the class described, a dynamo electric machine comprising a frame, a shaft mounted for rotation with respect to said frame, a plurality of stator windings in said frame, a plurality of rotors carried by said shaft for unitary rotation therewith, a first of said stators cooperating with a first of said rotors to comprise a first electric motor, a second of said stators cooperating with a second of said rotors to comprise a second, reversible electric motor, a third of said stators cooperating with a third of said rotors to comprise a synchronous alternator, said motors and said alternator being electrically independent, said first motor being arranged for operation at a predetermined speed, said alternator being arranged for generating alternating current of a selected frequency when rotated at said predetermined speed.

6. In a device of the class described, an electrical network comprising input and output reactive impedances connected by a first conductor in a first series circuit, first input and output resistive impedances connected by a second conductor in a second series circuit, first input and output terminals, said series circuits being connected in a parallel circuit between said first terminals, second input and output terminals, a third conductor joining said terminals, a reactive impedance connected across said second and third conductors, second input and output resistive impedances connected in parallel between said first conductor and said third conductor, and means for simultaneously varying said input resistive impedances and said output resistive impedances, said input resistive impedances having the same impedance ratio as said output impedances.

7. In a device of the class described, an electrical balanceable network having a frequency responsive member causing the network to have no output voltage for an input alternating voltage of a predetermined frequency and to have increasing output voltage for input alternating voltages of frequencies other than said predetermined frequency, the output voltages from said network due to frequencies greater than said predetermined frequency being displaced in phase by 180 degrees from the output voltages from said network due to frequencies less than said predetermined frequency, means supplying alternating voltages of generally said predetermined frequency to said network, and reversible means actuated by said network for varying the frequency of said supply of alternating voltage toward said predetermined value.

8. In a device of the class described, in combination, a dynamo electric machine comprising a frame, a shaft mounted for rotation with respect to said frame, a plurality of stator windings in said frame, a plurality of rotors carried by said shaft for unitary rotation therewith, a first of said stators cooperating with a first of said rotors to comprise a first electric motor, a second of said stators cooperating with a second of said rotors to comprise a second, reversible electric motor, a third of said stators cooperating with a third of said rotors to comprise a synchronous alternator, said motors and said alternator being severally electrically independent; an electrical network comprising input and output reactive impedances connected by a first conductor in a first series circuit, first input and output resistive impedances connected by a second conductor in a second series circuit, first input and output terminals, said series circuits being connected in a parallel circuit between said first terminals, second input and output terminals, a third conductor joining said terminals, a reactive impedance connected across said second and third conductors, second input and output resistive impedances connected in parallel across said first and third conductors, separate means for simultaneously varying said input resistive impedances and said output resistive impedances, respectively, said network offering infinite impedance to alternating current of a predetermined frequency and decreasing impedance to alternating currents of frequencies increasingly different from said predetermined frequency, said alternator generating alternating current of a frequency determined by the speed of rotation of said shaft, said first motor being arranged for normal operation at a speed generally that resulting in generation of alternating current of said predetermined frequency by said alternator, the current transmitted by said network due to frequency greater than said predetermined frequency being displaced in phase by 180 degrees from the currents transmitted by said network due to frequencies less than said predetermined frequency, and phase shift responsive means connecting said output terminals with said second electric motor, whereby to reversibly energize said motor for operation in a direction to augment the effect of said first electric motor if said generated frequency is less than said predetermined frequency, and for operation in a direction to oppose the effect of said first electric motor if said generated frequency is less than said predetermined frequency.

9. Means regulating the angular velocity of a dynamo electric machine in proportion to the square root of the reciprocal of the product of two factors, comprising said dynamo electric machine, an electric network having input and output terminals, means connecting said input terminals and said output terminals with said machine, and means adapted to impart primary energy of rotation to said machine, causing it to operate at an angular velocity within a desired range, an alternator comprised in said machine and generating alternating current of a frequency varying, within a range, with the angular velocity of said machine, said network offering infinite impedance to alternating current of a selected frequency and decreasing impedance to alternating currents of frequencies increasingly different from said frequency, first and second means for adjusting said network whereby to select said frequency within said range, reversible motor means comprised in said machine for augmenting and opposing the rotation of said machine due to said primary energy, said connecting means conducting said generated alternating current to said network and conducting currents transmitted by said network to said motor means, said transmitted currents differing in phase by 180 degrees depending on whether said generated frequency is greater or less than said selected frequency, said motor means augmenting said angular velocity when said generated frequency is less than said predetermined frequency and opposing said angular velocity when said generated frequency is greater than said predetermined frequency, the square of said selected frequency varying with the reciprocal of the product of the variables adjusted by said first and said second adjusting means.

10. In a device of the class described: a shaft to be rotated at a predetermined desired angular velocity; motor means supplying primary energy of rotation to said shaft, whereby to bring about rotation of said shaft at generally said predetermined desired velocity; means carried in part by said shaft for generating an alternating potential having a frequency determined by the velocity of said shaft; an electrical balanceable network having input and output terminals and having a frequency responsive member providing the network with such characteristics that the frequency of the output voltage at said output terminals is of a first phase upon the velocity of said shaft falling below the predetermined desired velocity and the frequency of the output voltage at said output terminals is 180° out of phase with respect to said first phase upon the velocity of said shaft rising above the predetermined desired velocity; means connecting said generating means with said input terminals to apply to said terminals a voltage of a frequency dependent upon the velocity of said shaft; further means responsive to reversible electrical energization for augmenting or opposing the effect of said primary energy of rotation upon the velocity of said shaft depending on whether the shaft velocity is below or above the predetermined desired velocity; and means connecting said further means with said output terminals of said network, said network reversibly energizing said further means whereby to augment the shaft velocity due to said motor means when the frequency of said generated potential is less than that corresponding to said predetermined desired velocity of said shaft, and to oppose the shaft velocity due to said motor means when the frequency of said generated potential is greater than that corresponding to said predetermined desired velocity of said shaft.

11. In a device of the class described, in combination: a rotating shaft; motor means applying torque to said shaft; an alternator driven by said shaft; an electrical balanceable network having at least a frequency responsive member, first and second variable impedance members, first and second manual control members, and means connecting said control members with said first and second variable impedance members of said network for adjustment of said impedance members; means connecting the output of said alternator to said network; and means connecting the output of said network in energizing relation to said motor means such that the product of the impedance values of said variable impedance members determines the square of the speed of rotation of the motor means and the alternator and thus the square of the frequency generated by the alternator.

12. In a device of the class described, in combination: a rotating shaft; motor means applying torque to said shaft; an alternator driven by said shaft; an electrical balanceable network having at least a frequency responsive member, first and second variable impedance members, first and second manual control members, and means connecting said control members with said first and second variable impedance members of said network for adjustment of said impedance members; means connecting the output of said alternator to said network; and means connecting the output of said network in energizing relation to said motor means such that the product of the impedance values of said variable impedance members inversely varies the square of the speed of rotation of the motor means and the alternator and thus the square of the frequency generated by the alternator.

13. In a device of the class described, in combination: a rotating shaft; motor means applying torque to said shaft; an alternator driven by said shaft; an electrical balanceable network having at least a frequency responsive member, first and second variable impedance members, first and second manual control members, and means connecting said control members with said first and second variable impedance members of said network for adjustment of said impedance members; means connecting the output of said alternator to said network; and means connecting the output of said network in energizing relation to said motor means such that the product of the impedance values of said variable impedance members directly varies the square of the speed of rotation of the motor means and the alternator and thus the square of the frequency generated by the alternator.

14. In a device of the class described, in combination: primary and secondary motor means jointly actuating a driven shaft; an alternator driven by said shaft; an electrical balanceable network having at least a frequency responsive member, first and second variable impedance members, first and second manual control members, and means connecting said control members with said first and second variable impedance members of said network for adjustment of said impedance members; means connecting the output of said alternator to said network; and means connecting the output of said network in energizing relation to said secondary motor means such that the product of the impedance values of said variable impedance members determines the square of the speed of rotation of the motor means and the alternator and thus the square of the frequency generated by the alternator.

15. In a device of the class described, in combination: a rotating shaft; motor means applying torque to said shaft; an alternator driven by said shaft; an electrical balanceable network having at least a frequency responsive member in the form of a capacitor, first and second variable impedance members, first and second manual control members, and means connecting said control members with said first and second variable impedance members of said network for adjustment of said impedance members; means connecting the output of said alternator to said network; and means connecting the output of said network in energizing relation to said motor such that the product of the impedance values of said variable impedance members inversely varies the square of the speed of rotation of the motor means and the alternator and thus the square of the frequency generated by the alternator.

16. In a device of the class described, in combination: a rotating shaft; motor means applying torque to said shaft; an alternator driven by said shaft; an electrical balanceable network having at least a frequency responsive member in the form of an inductor, first and second variable impedance members, first and second manual control members, and means connecting said control members with said first and second variable impedance members of said network for adjustment of said impedance members; means connecting the output of said alternator to said network; and means connecting the output of said network in energizing relation to said motor means such that the product of the impedance values of said variable impedance members directly varies the square of the speed of rotation of the motor means and the alternator and thus the square of the frequency generated by the alternator.

WILLIAM K. ERGEN.

REFERENCES CITED

The following references are of record in the file of this patent:

UNITED STATES PATENTS

| Number | Name | Date |
|---|---|---|
| 1,284,885 | Franklin | Nov. 12, 1918 |
| 1,694,637 | Bethenod | Dec. 11, 1928 |
| 2,093,665 | Tellegen | Sept. 21, 1937 |
| 2,186,843 | Shoults | Jan. 9, 1940 |
| 2,341,067 | Wise | Feb. 8, 1944 |